(12) United States Patent
Ida et al.

(10) Patent No.: US 8,760,012 B2
(45) Date of Patent: Jun. 24, 2014

(54) THREE-DIMENSIONAL SLIDING SYSTEM WITH ONBOARD LINEAR MOTOR

(75) Inventors: Eiji Ida, Kanagawa-ken (JP); Norimitsu Kitade, Tokyo (JP)

(73) Assignee: Nippon Thompson Co., Ltd., Tokyo (JP)

( * ) Notice: Subject to any disclaimer, the term of this patent is extended or adjusted under 35 U.S.C. 154(b) by 521 days.

(21) Appl. No.: 13/095,446

(22) Filed: Apr. 27, 2011

(65) Prior Publication Data

US 2011/0291494 A1 Dec. 1, 2011

(30) Foreign Application Priority Data

May 27, 2010 (JP) ................................. 2010-121489

(51) Int. Cl.
*H02K 41/00* (2006.01)
(52) U.S. Cl.
USPC ........................................................ 310/12.06
(58) Field of Classification Search
USPC ................................. 310/12.04, 12.05, 12.06
IPC ............................................ H02K 41/00, 41/02
See application file for complete search history.

(56) References Cited

U.S. PATENT DOCUMENTS

| 5,763,966 | A * | 6/1998 | Hinds | 310/12.06 |
| 6,555,936 | B1 * | 4/2003 | Tanaka et al. | 310/12.29 |
| 2001/0048249 | A1 * | 12/2001 | Tsuboi et al. | 310/12 |
| 2006/0186741 | A1 * | 8/2006 | Kasahara et al. | 310/12 |

FOREIGN PATENT DOCUMENTS

| JP | 2006-238540 A | 9/2006 |
| JP | 2007-300759 A | 11/2007 |
| JP | 2007-325389 A | 12/2007 |

* cited by examiner

*Primary Examiner* — Dang Le
(74) *Attorney, Agent, or Firm* — Browdy and Neimark, PLLC

(57) ABSTRACT

A three-dimensional sliding system has an X-table and a Z-table, which are actuated to travel independently of each other. The sliding system is simple in construction and adapted to actuate a movable table with less takt time. A bed has a first flat zone extending in a horizontal direction to carry the X-table thereon, a second flat zone extending in a vertical direction to carry the Z-table thereon, and a third flat zone where the first flat zone merges with the second flat zone. The movable table is laid over the third flat zone and linked with the X-table and the Z-table through linear motion guide units, respectively. Actuations of an X-linear motor in an X-direction and actuation of a Z-linear motor in a Z-direction cause the movable table to move into a targeted position with high precision in the X-direction and in the Z-direction.

10 Claims, 5 Drawing Sheets

US 8,760,012 B2

THREE-DIMENSIONAL SLIDING SYSTEM WITH ONBOARD LINEAR MOTOR

FIELD OF THE INVENTION

The present invention relates to a three-dimensional sliding system with an onboard linear motor to control the movement of a table or the like in an X-direction, or the horizontal in practical application, and in a Z-direction, or the vertical in practical application, to provide accurate position control of a workpiece including a part, component, and so on. The three-dimensional sliding system with an onboard linear motor of the type recited earlier has been incorporated in component placement systems, for example commonly called pick-and-place machines, which have been extensively used in fields as diverse as semiconductor fabricating equipments, various assembling machines, and so on.

BACKGROUND OF THE INVENTION

Modern semiconductor fabricating equipments or various types of assembling machines used in years are needed to meet a diversity of anticipated design specifications of more miniaturization, and making it possible to work with high speed, high acceleration/deceleration, fast response, high position-control, and so on. Correspondingly, the same sort of design specifications as stated earlier is also required in the component placement systems such as the pick-and-place machines and pick-and-insert machines, which is envisaged carrying out a sequence of picking up a workpiece including a part, component and so on, transferring the workpiece to a desired placement position, and placing the workpiece on the desired position with high precision.

In Japanese Laid-Open Patent Application No. 2006-238 540, or reference 1, which is a commonly-assigned senior application, there is disclosed an example of the sliding system with an onboard linear motor, which is used for pick-and-place machines. The sliding system is intended to work in standing posture that is classified as a vertical sliding system. The prior sliding system has a stationary bed of flat configuration having a vertical front surface and a vertical rear surface, an X-table allowed to travel relatively to the bed in an X-direction lying in the horizontal by an X-linear motor, and a Z-table allowed to travel relatively to the X-table in a Z-direction lying in the vertical, especially, perpendicularly to the horizontal by a Z-linear motor. With the sliding system constructed as stated earlier, the Z-table and the X-table are both laid on any one vertical surface of the bed so as not to overlap one another to make the sliding system itself slim in thickness and compact in construction. All of the bed, X-table and the Z-table are made of magnetic material, especially steel and, therefore, the X-table functions as a magnetic yoke of the X-linear motor while the Z-table serves as a winding yoke of the Z-linear motor.

Another prior sliding device with onboard moving-magnet linear motor is disclosed in, for example Japanese Laid-Open Patent Application No. 2007-300 759, or reference 2 which is assigned to the same assignee as the present disclosure. The prior sliding device has a field magnet secured on the underside of a table and composed of magnet strips juxtaposed in an array that their polarities alternate in an sliding direction of the table, and an armature assembly having a plurality of armature windings lying on an upper side of the bed facing on the table in opposition to the field magnet, the armature windings being each composed of a coreless coil formed in a flat rectangular shape. With the armature assembly, more especially, the armature windings are laid on a circuit board secured on the upper surface of the bed. A protective sheet of thin film is applied to shield the exposed surfaces of the armature windings opposite to the circuit board, and then a molding of adhesive material of bonding agent to make the armature windings integral with the circuit board. Some instruments and components including limit sensors, before-origin sensors, and so on are dislodged from the sliding device, and therefore the armature assembly has only the armature windings and the associated wirings. On the underneath of the table, moreover, there is placed none of end plates, auxiliary magnets, sensor magnets, origin marks, and so on which have been so far installed with accompanying the field magnets. Though this prior construction as stated earlier makes it possible to render the sliding device compact in construction and simple in system design, the armature windings and the field magnets couldn't get out of becoming more massive than ever to increase the propelling force or thrust in the sliding device.

In the prior sliding system with an onboard linear motor adapted to be used for pick-and-place machines, recited with reference to the first cited prior art, the Z-table is connected with the X-table so as to be able to move in both the X-direction and the Z-direction with respect to the bed. With the prior sliding system constructed as stated earlier, however, the difficulty is that even if the propelling power of the onboard X-linear motor and Z-linear motor is envisaged increasing to raise the working efficiency, that is, takt time or cycle time, the sliding system itself would become more massive because the X-table loaded with the Z-table would become increasingly weighty. Thus, it remains a major challenge to maintain the property of high working-efficiency, or high productivity with short takt-time without becoming larger or bulkier in construction.

The sliding system with an onboard linear motor recited in the second cited prior art would teach or suggest that the X-Y sliding system free to move both in X-direction and in Y-direction could be provided easily by just connection of a pair of sliding devices in perpendicular to each other. Nevertheless, the pick-and-place machines need the sliding system less in takt time or cycle time. To this end, it remains a challenge to make the movable components or parts less in weight.

SUMMARY OF THE INVENTION

The present invention has as its primary object to overcome the subject stated earlier and more particular to provide a three-dimensional X-Z sliding system suited for pick-and-place machines. The three-dimensional X-Z sliding system is composed of a stationary component of a bed, and a moving component made up of a movable table, an X-table actuating the movable table in an X-direction with an X-linear motor, and a Z-table actuating the movable table in a Z-direction with a Z-linear motor. According to the present invention, especially, the moving component can be made as less as possible in weight and size. Moreover, the X-table and Z-table make it easier to operate independently of each other to get the movable table actuating with high takt or cycle time and high accuracy.

The present invention relates to a three-dimensional X-Z sliding system comprising; a stationary flat bed having a front surface and a rear surface lying in parallel with each other and lying in a Z-direction, an X-linear motor energized in an X-direction, a Z-linear motor energized in a Z-direction perpendicular to the X-direction, and a movable table allowed moving in the X-direction and the Z-direction by the energization of the X-linear motor and the Z-linear motor, respectively;

wherein the bed has an angled configuration composed of a first flat zone extending in the X-direction, a second flat zone extending in the Z-direction and a third flat zone where the first flat zone merges with the second flat zone, the bed being provided thereon with an X-table of rectangular configuration for traveling in the X-direction over the first flat zone and a Z-table of rectangular configuration for traveling in the Z-direction over the second flat and third flat zones; and wherein the movable table is a plate member small in size in comparison with the bed, the movable table lying to overlap with a front surface of the X-table and a front surface of the Z-table and having connections at a rear surface thereof with linear motion guide units one of which is installed on the X-table to force the movable table in the X-direction and another is installed on the Z-table to force the movable table in the Z-direction, whereby the movable table is controlled to move with respect to the bed in the X-direction and the Z-direction to a targeted position.

According to one aspect of the present invention, there is disclosed a three-dimensional X-Z sliding system, which is used disposed in a posture in which the X-direction lies in a horizontal direction and the Z-direction coincides with a vertical direction.

According to another aspect of the present invention, a three-dimensional X-Z sliding system is disclosed in which the movable table is placed on the bed in such geometry as having a protruding part beyond the bed, the protruding part having a clamping device including a chuck and a grip. The movable table has an angled shape, which includes therein a horizontal area extending from the X-table to the Z-table to lie over partially at one end the front surface of the X-table and at other end the front surface of the Z-table, and the downward protrusion lying over the front surface of the Z-table while extending down vertically in the Z-direction from the horizontal area so as to protrude beyond the Z-table. Moreover, the movable table is fastened on a rear surface thereof with a linear motion guide unit, which is installed on the front surface of the X-table for sliding movement in the Z-direction, and further connected on the rear surface thereof with another linear motion guide unit, which is arranged on the front surface of the Z-table for sliding movement in the X-direction.

According to another aspect of the present invention, a three-dimensional X-Z sliding system is disclosed in which the X-table has a rectangular configuration having two opposite longer sides extending in the X-direction to an extent enough to lie over the first zone of the front surface on the bed, and the Z-table also has a rectangular configuration having two opposite longer sides extending in the Z-direction so as to cover substantially both the second zone and the third zone of the front surface on the flat bed, and further the X-table and the Z-table are installed on the bed to travel respectively without running into each other while ensuring the traveling range desired for each table.

According to another aspect of the present invention a three-dimensional X-Z sliding system is disclosed in which the linear motion guide unit installed on the Z-table is placed so as to extend on the front surface of the X-table along one shorter edge of the rectangular configuration of the X-table situated closed to the Z-table, and the linear motion guide unit installed on the front surface of the X-table is placed so as to extend on the front surface of the Z-table along a lower one of two shorter opposite edges of the Z-table. Moreover, a three-dimensional X-Z sliding system is disclosed in which the linear motion guide units installed on the X-table and the Z-table, one to each table, are the same height starting at bottoms of the guide rails of the linear motion guide units and ranging up to tops of sliders of the linear motion guide units so that the front surfaces of the X-table and the front surface of the Z-table are coplanar or flush with one another, and the movable table after fastened on the rear surface thereof to the sliders, is placed of its own accord in the direction perpendicular to the bed in opposition to the surface of the bed.

According to another aspect of the present invention, a three-dimensional X-Z sliding system is disclosed in which the X-linear motor has a field magnet fastened to the rear surface of the X-table and an armature assembly lying on one side of the bed in opposition to the field magnet, the field magnet being composed of a plurality of magnet strips juxtaposed closely in an array that their polarities alternate in a traveling direction of the X-table, and the armature assembly having a plurality of careless armature windings of rectangular shape lying in juxtaposition on one side of the bed facing on the X-table; further in which the Z-linear motor has a field magnet fastened to the rear surface of the Z-table, and an armature assembly lying on one side of the bed in opposition to the field magnet, the field magnet being composed of a plurality of magnet strips juxtaposed closely in an array that their polarities alternate in a traveling direction of the Z-table, and the armature assembly having a plurality of coreless armature windings of rectangular shape lying in juxtaposition on one side of the bed facing on the Z-table; and in which the armature assemblies of the X-linear motor and the Z-linear motor are identical in construction with one another and have the armature windings each of which is placed on one surface of a circuit board that is secured on other surface thereof to the one surface of the bed opposite to the X-table and the Z-table, and a protective sheet of thin film shields exposed surfaces of the armature windings opposite to the circuit board and further adhesive material of bonding agent molds the armature windings integral with the circuit board.

According to another aspect of the present invention, a three-dimensional X-Z sliding system is disclosed in which the bed, X-table and Z-table are made of magnetic material including steel, the X-table and the Z-table functioning as magnet yokes for the X-linear motor and the Z-linear motor, and the bed serving as winding yokes for the X-linear motor and the Z-linear motor; and in which the bed has a cooling system of passages each of which allows a cooling medium to flow to carry away heat arising from the X-linear motor and the Z-linear motor, the passage spreading or extending throughout the first flat zone and the second flat zone across the third flat zone. More especially, the cooling passages are constituted with a plurality of grooves, which are provided on the rear surface of the bed in opposition to both of the X-linear motor and the Z-linear motor in such a fashion as to spread in parallel with each other throughout the first zone and the second zone across the third zone.

With a three-dimensional sliding system in which the X-table and the Z-table are mounted on the stationary bed for traveling independently of each other and the movable table is liked with both the X-table and the Z-table as stated earlier, the weights of the X-table and the Z-table, when traveling in the X-direction and the Z-direction respectively, can't influence each other and, therefore, the X-linear motor and the Z-linear motor can afford to bring the X-table and the Z-table more propelling power. The X-table has the X-linear motor to exert the traveling force on the X-table in the X-direction or the horizontal direction, and the Z-table is provided thereon with the Z-linear motor to get the Z-table traveling in the Z-direction or the verticality, especially the perpendicularity. The movable table is linked with the X-table and the Z-table through their respective linear motion guide units so as to move in both the X-direction and the Z-direction. The combination of the tables as stated just above helps to weigh less the objects to be actuated, raising the propelling powers of the X-linear motor and the Z-linear motor, eventually getting the takt time or cycle time shorter remarkably. Moreover, the construction in which the movable table is just secured on the rear surface thereof to the X-table and the Z-table makes it easier to mount and/or demount the movable table out of the X-table and the Z-table. Both the linear motion guide units installed on the X-table and the Z-table, one to each table, are the products identical with each other in construction. Thus, the X-table and the Z-table are made coplanar or flush with one another. Moreover, there is provided a cooling unit to cool the bed to thereby pick up and carry away heat arising from the X-linear motor and the Z-linear motor. The three-dimensional X-Z sliding system of the present invention constructed as stated earlier succeeds in improving the propelling power or thrust with compact and simple in construction.

DETAILED DESCRIPTION OF THE PREFERRED EMBODIMENTS

Figure 1:
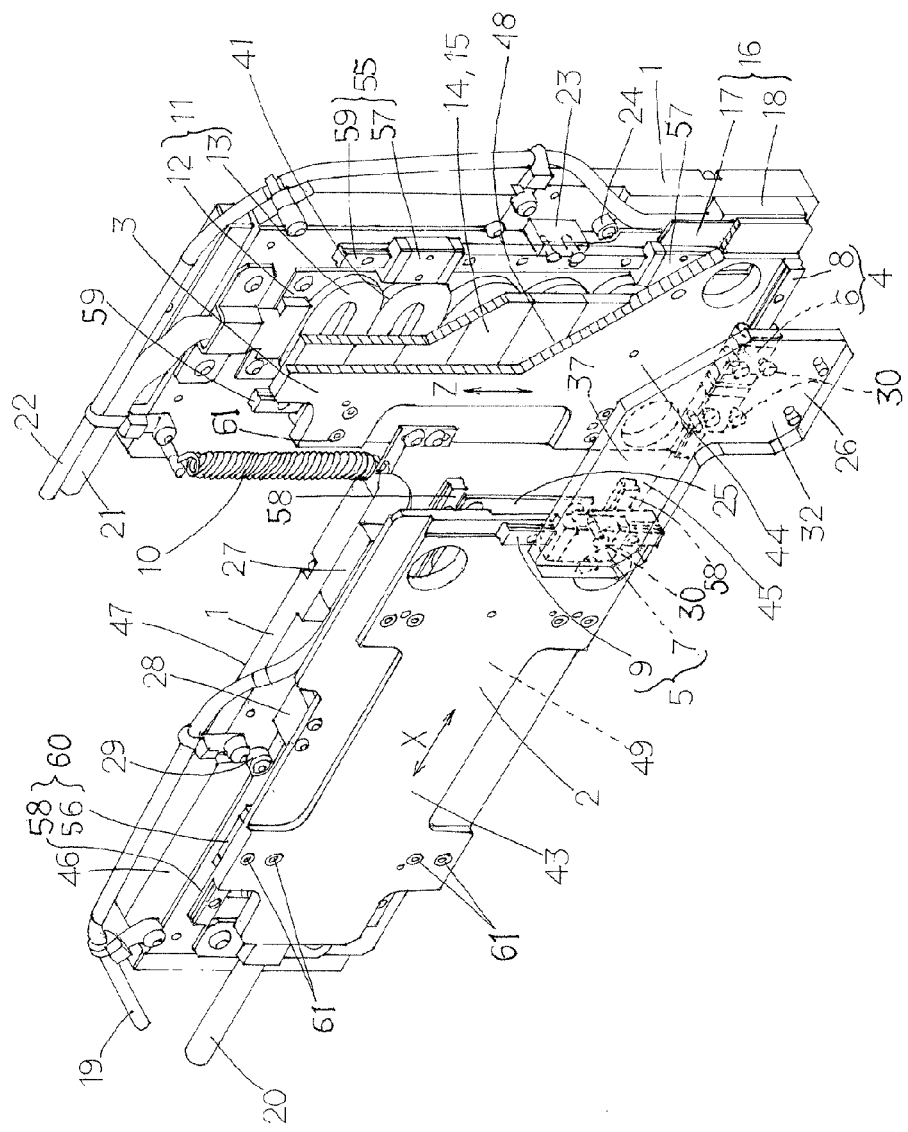
FIG. 1 is a partially cutaway view in perspective illustrating a preferred embodiment of a three-dimensional X-Z sliding system with onboard linear motor according to the present invention.

The three-dimensional sliding system with an onboard linear motor of the present invention is preferred to find application to the pick-and-place machines which are used in, for example semiconductor fabricating equipments, various assembling machines, and so on. The three-dimensional X-Z sliding system of the present invention has a movable table which is allowed to move or shift in an X-direction while in a Z-direction perpendicular to the X-direction. Especially in case of practical application, the X-direction is laid in the horizontal and the Z-direction is placed in the vertical. Thus, the sliding system of the present invention is envisaged working at the vertical posture perpendicular to the machine base on which the sliding system is mounted. With the three-dimensional X-Z sliding system constructed according to the present invention, the movable table weighs as less as possible and movable loads implicated in travel in the X-direction and the Z-direction, respectively, also weigh as less as possible. The movable table is connected through linear motion guide units to both of the X-table with onboard X-linear motor which is allowed to travel in the X-direction and the Z-table with onboard Z-linear motor which is allowed to travel in the Z-direction. Thus, the movable table can travel either of the X-direction and the Z-direction. Less loads implicated in travel in the X-direction and Z-direction result in less inertial force and eventually substantial reduction in the takt time or cycle time of the movable table. With the three-dimensional X-Z sliding system of the present invention, moreover, the X-linear motor and the Z-linear motor carried on the X-table and Z-table, respectively, are the linear motor of the same type as disclosed in the reference 2 recited earlier, which is assigned to the same assignee as the present disclosure. This linear motor is considered compact in construction and further advantageous to the higher propelling power or thrust and effective to provide the simple system design.

Preferred embodiments of a three-dimensional sliding system with onboard linear motor according to the present invention will be explained hereinafter in detail with reference to the accompanying drawings. The three-dimensional sliding system of the present invention, as shown in FIGS. 1 through 6, has a stationary component of a flat bed 1, which has a front surface 46 and a rear surface 47 extending or spreading in parallel with each other. The flat bed 1 is laid in standing or extending vertically in a Z-direction. A movable table 32 is placed through an X-table 2 and a Z-table 3 on the front surface 46 of the flat bed 1 extending vertically in the Z-direction. It will be thus understood that the movable table 32 provides the sliding system which is allowed to move relatively to the flat bed 1 in either of the X-direction and the Z-direction perpendicular to the X-direction. The movable table 32 is of a plate very small in size in comparison with the bed 1 and is placed on the bed 1 in such geometry as protruding partly at protrusion 26 out of or beyond the lowest edge of the bed 1. A front surface 45 or a rear surface 50 of the protrusion 26 are available to the provision of diverse chucks and/or grips, not shown, to clamp or grasp any part such as workpiece or the like to modify the three-dimensional sliding system so as to conform to the pick-and-place machine.

Figure 3:
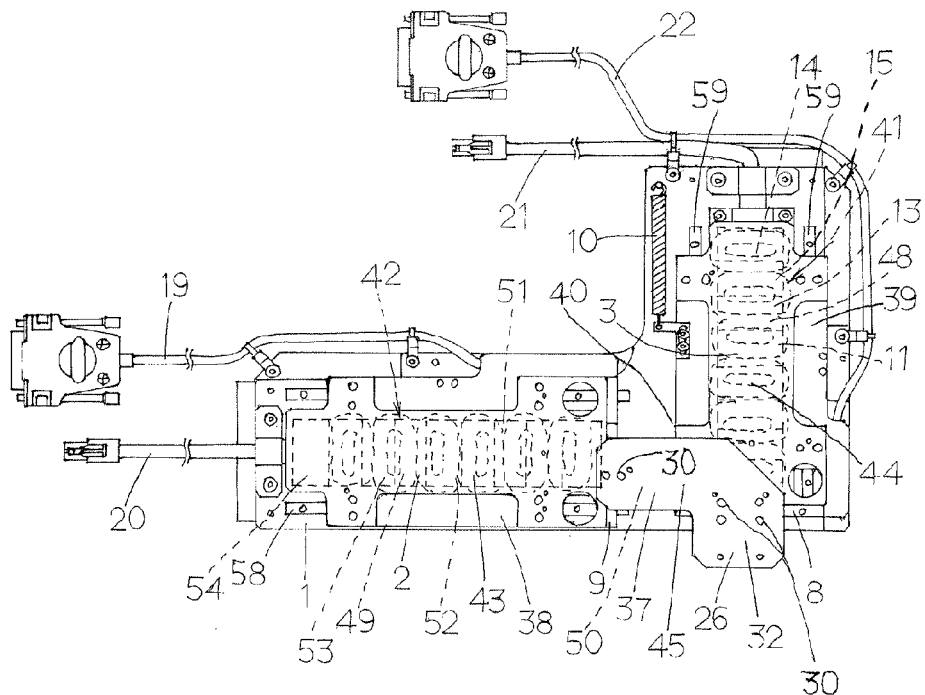
FIG. 3 is a view in front elevation of the sliding system of FIG. 1.

With the three-dimensional X-Z sliding system constructed as stated earlier, the flat bed 1 serving as the stationary component, as shown in FIG. 3, has the front surface of a right-angled configuration when viewed head-on, in other words, an inversed L-shape, but an L-shape when viewed from the rear side. The front surface 46 of the flat bed 1 is composed of a first flat zone 38 extending in the X-direction, a second flat zone 39 extending in the Z-direction, and a third flat zone 40 where the first flat zone 38 merges squarely with the second flat zone 39. The X-table 2 of rectangular configuration is placed on the first flat zone 38 of the front surface 46 of the bed 1 so as to be allowed to move in the X-direction or the horizontal relatively to the bed 1. The Z-table 3 of rectangular configuration is placed for linear travel or movement from the second flat zone 39 to the third flat zone 40 of the front surface 46 of the bed 1. The movable table 32 is laid to overlap with the front surface 43 of the X-table 2 and the front surface 44 of the Z-table 3. The movable table 32 is connected on a rear surface 50 thereof with linear motion guide units 4 and 5 one of which is placed on the X-table 2 and the other is placed on the Z-table 3. Thus, the movable table 32 can be moved in the X-direction as the X-table 2 is actuated to travel in the X-direction with energization of the X-linear motor 42 carried on the X-table 2. Moreover, the movable table 32 is forced in the Z-direction as the Z-table 3 is actuated to travel in the Z-direction with energization of the Z-linear motor 41 carried on the Z-table 3. More especially, as seen in a moving locus tracing movement of the movable table 32 from a position P1 to another position P2 in FIG. 7(a), movement of the movable table 32 in the X-direction from the position P1 to the position P2 is caused by traveling of just the X-table 2 together with the movable table 32. In contrast, movement of the movable table 32 in the Z-direction is carried out by traveling of only the Z-table 3 together with the movable table 32. This means that the weight to be moved actually or the load implicated in traveling will be rendered less remarkably and correspondingly inertial force becomes less. As a result, the Z-linear motor 41 and the X-linear motor 42 to move the movable table 32 require less driving force. Instead, increase of the thrust exerted on the movable table 32 eventually results in substantial reduction in the takt time or cycle time of the movable table 32.

The X-table 2 has a flat rectangular configuration having two opposite longer sides extending in the X-direction to the extent enough to lie over the first flat zone 38 of the front surface 46 on the flat bed 1. The Z-table 3 also has a flat rectangular configuration having two opposite longer sides extending in the Z-direction so as to cover substantially both the second flat zone 39 and the third flat zone 40 of the front surface 46 on the flat bed 1. The X-table 2 and the Z-table 3 are allowed to move respectively without running into each other and, further placed as close as permitted to each other while ensuring the movable range or limits, or stroke desired for each table. Reference sings 28 and 29 denote stoppers to define the limits for the X-table 2. Other reference sings 23 and 24 are stoppers to define the limits for the Z-table 3.

Figure 4:
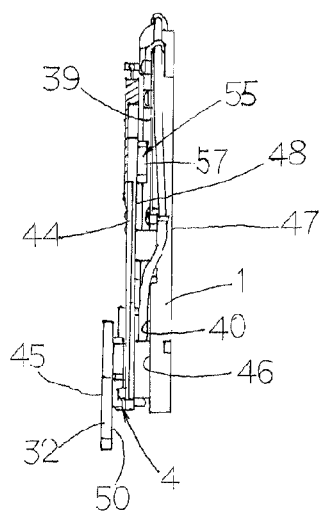
FIG. 4 is a view in side elevation of the sliding system of FIG. 3.

The movable table 32 has a flat configuration of a generally right-angled or inverted L-shape, which includes therein a horizontal area 37 extending from the X-table 2 to Z-table 3 to lie over partially at one end the front surface 43 of the X-table 2 and at other end the front surface 44 of the Z-table 3, and the downward protrusion 26 lying over the front surface 44 of the Z-table 3 while extending down vertically in the Z-direction from the horizontal area 37 so as to protrude beyond the Z-table 3. The movable table 32 of the flat configuration as shown in FIGS. 1, 3 and 4 is fastened on a rear surface 50 thereof with a slider 7 of a linear motion guide unit 5, which is placed on the surface 43 of the X-table 2 of rectangular shape for sliding movement in the Z-direction. Moreover, the movable table 32 is connected on the rear surface 50 thereof at bolts 30 to a slider 6 of a linear motion guide unit 4, which is arranged on the surface 44 of the Z-table 3 of rectangular shape for sliding movement in the X-direction.

The linear motion guide unit 5 is secured to the front surface 43 of the flat X-table 2 of rectangular configuration so as to extend along one shorter edge of the flat X-table 2 situated closer to the Z-table 3. Another linear motion guide unit 4 is fastened to the front surface 44 of the flat Z-table 3 of rectangular configuration so as to extend along a lower one of two shorter opposite edges of the flat Z-table 3. The linear motion guide unit 5 is composed of an elongated guide rail 9 fastened to the front surface 43 of the X-table 2 to extend in the Z-direction, and the slider 7 secured to the rear surface 50 of the movable table 32 so as to fit over or conform to the guide rail 9 for sliding movement lengthwise of the guide rail 9. In contrast, the linear motion guide unit 4 is composed of an elongated guide rail 8 fastened to the front surface 44 of the Z-table 3 to extend in the X-direction, and the slider 6 secured to the rear surface 50 of the movable table 32 so as to fit over or conform to the guide rail 8 for sliding movement lengthwise of the guide rail 8. Both the linear motion guide units 4 and 5 are the products of the common identification number, which have the same height starting at the bottoms of the guide rails 8 and 9 and ranging up to the tops of the sliders 6 and 7. Thus, the front surface 43 of the X-table 2 and the front surface 44 of the Z-table 3 are made coplanar or flush with one another. The movable table 32, after fastened on the rear surface 50 thereof to the sliders 6 and 7 of the linear motion guide units 4 and 5, can be placed of its own accord in the Z-direction on the plane preselected in opposition to an X-Z plane lying on the flat bed 1, which is laid in the Z-direction, or the vertical in practical application. This means the movable table 32 can be brought into the placement position with ease and accuracy.

The movable table 32 is connected with the X-table 2 through the linear motion guide unit 5 so as to move in the Z-direction and also linked with the Z-table 3 through the linear motion guide unit 4 to move in the X-direction. As a result, traveling of the Z-table 3 in the Z-direction causes the movement in the Z-direction of the movable table 32 which is connected with the Z-table 3 through the linear motion guide unit 4 lying in perpendicular to the Z-direction. The linear motion guide unit 5, because of the slider 7 thereof being for linear movement in the Z-direction, may not interfere with the movement of the movable table 32 during traveling of the Z-table 3 in the Z-direction as stated earlier. In contrast, traveling of the X-table 2 in the X-direction causes the movement in the X-direction of the movable table 32 which is connected with the X-table 2 through the linear motion guide unit 5 lying in perpendicular to the X-direction. The linear motion guide unit 4, because of the slider 6 thereof being for linear movement in the X-direction, may not interfere with the movement of the movable table 32 during traveling of the X-table 2 in the X-direction as stated earlier. With the X-Z geometry constructed as stated earlier, even when travels of the X-table 2 and the Z-table 3 synchronize with each other, the movable table 32 is allowed to move to the preselected location or position on the X-Z plane with respect to the flat bed 1, which is laid in the Z-direction, or the vertical in practical application.

With the three-dimensional X-Z sliding system of the present invention, the Z-table 3 is carried on the stationary bed 1 for sliding travel in the Z-direction through a linear motion guide unit 55. The Z-table 3 in opposition to the bed 1 has a Z-linear motor 41 with a linear encoder 16 to propel or force the Z-table 3, thereby placing the movable table 32 at the desired or correct location. The X-table 2 is also carried on the stationary bed 1 for sliding travel in the X-direction through a linear motion guide unit 60 and further provided in opposition to the bed 1 with a X-linear motor 42 having a linear encoder working as the linear encoder 16 to propel the X-table 2 together with the movable table 32, thereby bringing the movable table 32 to the desired or correct location. The X-linear motor 42 and the Z-linear motor 41 are substantially same in construction and preferably the same type as disclosed in the reference 2 as recited earlier, which is assigned to the same assignee as the present disclosure. This linear motor is considered compact in construction and further advantageous to the higher propelling power or thrust and effective to provide the simple system design.

The X-linear motor 42 has a field magnet 51 fastened to the rear surface 49 of the X-table 2, and an armature assembly 52 lying on one side of the bed 1 in opposition to the field magnet 51. The field magnet 51 is composed of a plurality of magnet strips 54 juxtaposed closely in an array that their polarities alternate in a direction of travel of the X-table 2. The armature assembly 52 has a plurality of careless armature windings 53 of rectangular shape lying in juxtaposition on one side of the bed 1 facing on the X-table 2. With the armature assembly 52, the armature windings 53 are placed on one surface of a circuit board 25 which is secured on the other surface thereof to the confronting surface of the bed 1. A protective sheet of thin film is applied to shield the exposed surfaces of the armature windings 53 opposite to the circuit board, and then a molding of adhesive material of bonding agent is applied to make the armature windings 53 integral with the circuit board 25. The Z-linear motor 41, as with X-linear motor 42, has a field magnet 14 fastened to the rear surface 48 of the Z-table 3, and an armature assembly 11 lying on one side of the bed 1 in opposition to the field magnet 14. The field magnet 14 is composed of a plurality of magnet strips 15 juxtaposed closely in an array that their polarities alternate in a direction of travel of the Z-table 3. The armature assembly 11 has a plurality of coreless armature windings 13 of rectangular shape lying in juxtaposition on one side of the bed 1 facing on the Z-table 3. With the armature assembly 11, the armature windings 13 are placed on one surface of a circuit board 12 which is secured on the other surface thereof to the confronting surface of the bed 1. A protective sheet of thin film is applied to shield the exposed surfaces of the armature windings 13, and then a molding of adhesive material of bonding agent is applied to make the armature windings 13 integral with the circuit board 12.

With the version discussed here, the X-linear motor 42 is composed of the field magnet 51 having nine pieces of the magnet strips 54, and the armature assembly 52 having six pieces of the armature windings 53. As for the Z-linear motor 41, moreover, the number of the magnet strips 15 of the field magnet 14 is put to eight and the armature windings 13 of the armature assembly 11 are six pieces.

Figure 2:
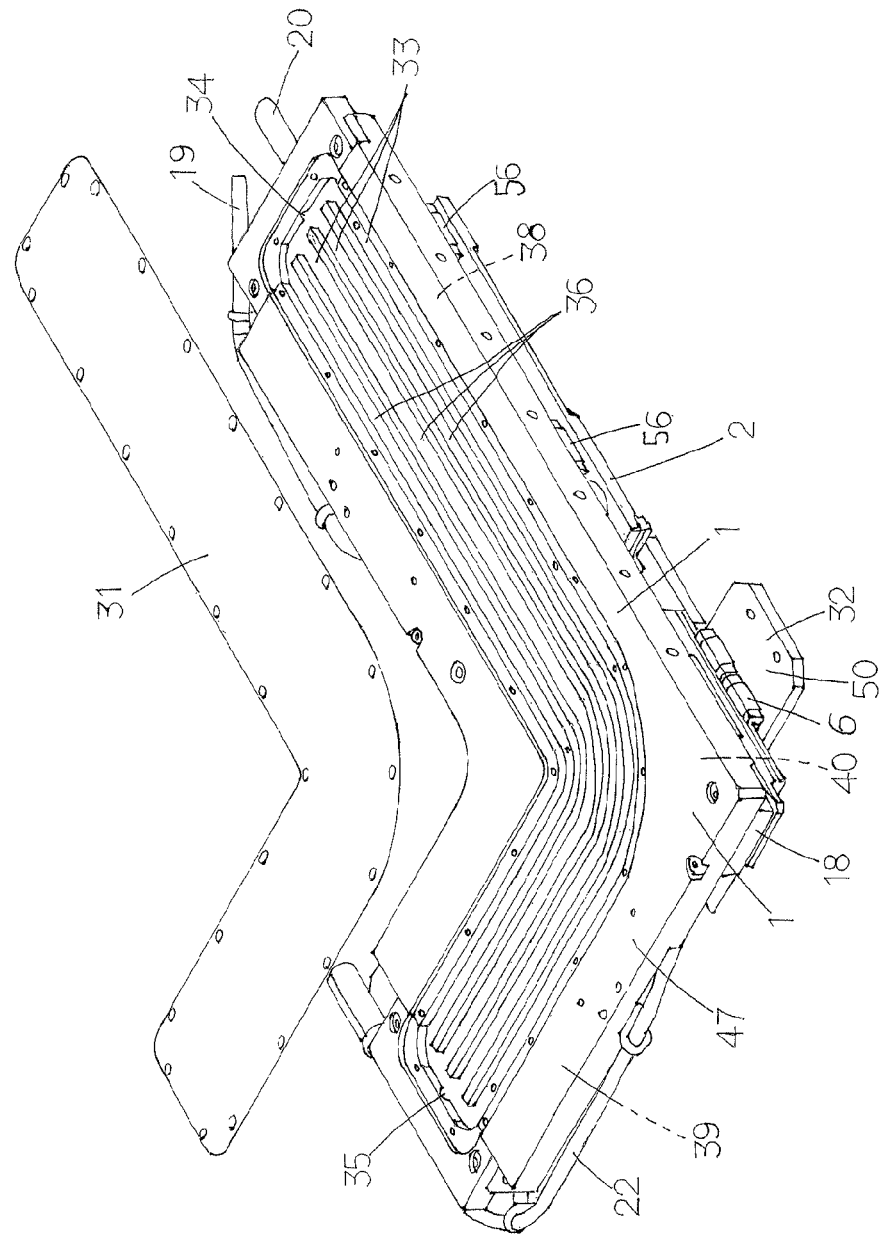
FIG. 2 is a view in perspective of the sliding system as viewed from the rear opposite to the side seen in FIG. 1, but a rear cover being shown removed.
Figure 5:
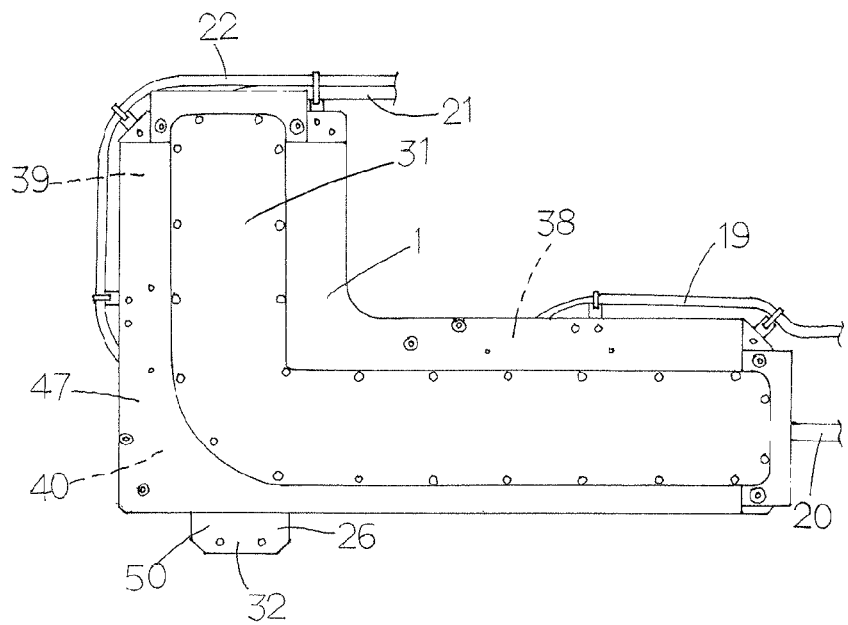
FIG. 5 is a view in rear elevation of the sliding system of FIG. 3.
Figure 6:
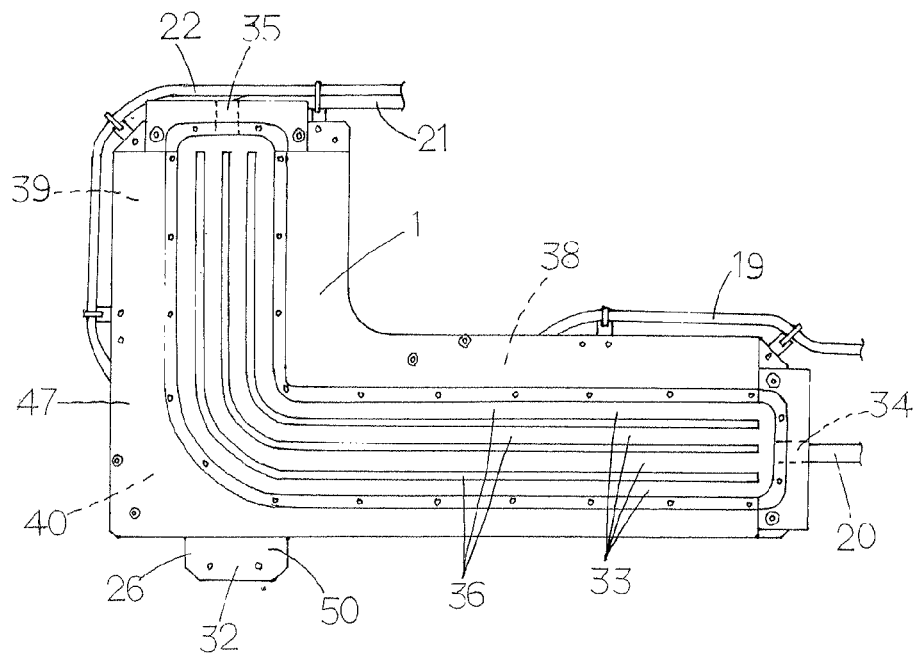
FIG. 6 is a view in rear elevation of the sliding system similar with in FIG. 5, but the rear cover being shown removed.

With the three-dimensional X-Z sliding system of the present invention, all of the bed 1, X-table 2 and Z-table 3 are of magnetic material including steel, and so on. The X-table 2 and Z-table 3 serve as magnet yokes for the X-linear motor 42 and the Z-linear motor 41, respectively, while the bed 1 functions as winding yokes for the X-linear motor 42 and the Z-linear motor 41, thereby becoming a major contributor to make it possible to render the sliding system slim or compact in construction. With the three-dimensional X-Z sliding system constructed as stated earlier, moreover, the bed 1 doubling as the winding yoke makes it possible to provide a cooling unit on the bed 1 as shown in FIGS. 2, 5 and 6 to easily pick up and carry away heat arising from the armature windings 13 and 53, thereby improving the effective propelling power or thrust. The cooling unit employed in the version illustrated here is an air-cooling system which is constituted with a plurality of grooves 33 made on the rear surface 47 of the bed 1 in such a fashion as to spread throughout the first flat zone 38 and the second flat zone 39 across the third flat zone 40, and a covering member 31 fastened to the bed 1 to close the grooves 33 to define air passages 36 between them. An air ingress 34 is provided at an traverse end of the first flat zone 38 and an air egress 35 is made at a traverse end of the second flat zone 39 so that the air is allowed to enter the air passages 36 at the air ingress 34 and leave the air passages 36 at the air egress 35. It was proved that the three-dimensional X-Z sliding system having the air-cooling system constructed as stated earlier succeeded in improving the rated propelling power of thrust from 16N up to 20N.

The movable table 32 as shown in FIG. 3 is remarkably small in size in comparison with the bed 1 having the equivalent in size of the overall sliding system, more especially a fifth or so of the bed 1, or a eighth in area ratio. With the sliding system actually embodied, a movable mass implicated in traveling of the X-table 2 with the movable table 32 in the X-direction was 0.38 kg and another movable mass of the Z-table 3 with the movable table 32 in the Z-direction was 0.35 kg. Correspondingly, the thrust per kg was 42 in the X-direction and 45 in the Z-direction. This embodiment was proved to be twice or more in thrust as high as the prior sliding system disclosed in the reference 1, which showed the thrusts of 16 in the X-direction and 21 in the Z-direction.

The linear encoder 16 using photoelectric effect to sense the position of the Z-table 3 is placed in a location nearer the movable table 32 and composed of a linear scale 17 secured on the rear surface 48 of the Z-table 3 in such a way as to extend in the direction of travel of the Z-table 3 along an outward longer edge of the Z-table 3, and a sensing element 18 lying on the bed 1 in opposition to the linear scale 17. Another linear encoder using photoelectric effect, not shown as like the linear encoder 16 recited above, to sense the position of the X-table 2 is placed in a location nearer the movable table 32 and composed of a linear scale, not shown as like the linear scale 17 recited above, fastened on the rear surface 49 of the X-table 2 in such a way as to extend in the direction of travel of the X-table 2 along an outward longer edge of the X-table 2, and a sensing element 27 lying on the bed 1 in opposition to the linear scale. With the three-dimensional X-Z sliding system constructed as stated earlier, a signal line 19 leading to the sensing element 27 and another signal line 22 leading to the sensing element 18, since being secured to the stationary bed 1, are more invulnerable against disconnection of signal lines, which would be caused by repeatedly cyclic workings, than ever and therefore suited for keeping the working environment clean. The signal lines 19 and 22, as wired entirely outside the sliding system, are easier and safer in wiring work than ever. Moreover, the power source and the controls implicated in the X-linear motor 42 and the Z-linear motor 41, although not shown, are installed outside the sliding system. Reference sign 20 denotes a power line to energize the armature windings 53 of the X-linear motor 42 and reference sign 21 is a power line to energize the armature windings 13 of the Z-linear motor 41.

With the three-dimensional X-Z sliding system of the present invention, the linear motion guide unit 60 to bear the X-table 2 for sliding travel is composed of a pair of elongated guide rails 58 that are fastened with screws to one surface of the bed 1 facing on the X-table 2 so as to extend in the X-direction, and sliders 56 secured with fastening screws 61 to the rear surface 49 of the X-table 2 to fit over or conform to the guide rails 58, two for each guide rail 58, for sliding travel or movement along the guide rails 58. Likewise, the linear motion guide unit 55 to bear the Z-table 3 for sliding travel is composed of a pair of elongated guide rails 59 that are fastened with screws to one surface of the bed 1 facing on the Z-table 3, and sliders 57 secured with fastening screws 61 to the rear surface 48 of the Z-table 3. The sliders 57 fit over or conform to the guide rails 59, two for each rail 59, for sliding travel or movement along the guide rails 59. There is provided a balancing coil spring 10 to keep the Z-table 3 in proper weight balance in the Z-direction, or the vertical in practical application. The balancing coil spring 10 as shown in FIGS. 1 and 3 is placed on the upside of the surface of the Z-table 3 facing on the X-table 2 and connected at one end thereof with the bed 1 while at another end thereof with the Z-table 3. The coil spring 10 employed in the version described here was substantially same in construction as disclosed in Japanese Laid-Open Patent Application No. 2007-325 389, which was assigned to the same assignee as the present disclosure.

Figure 7:
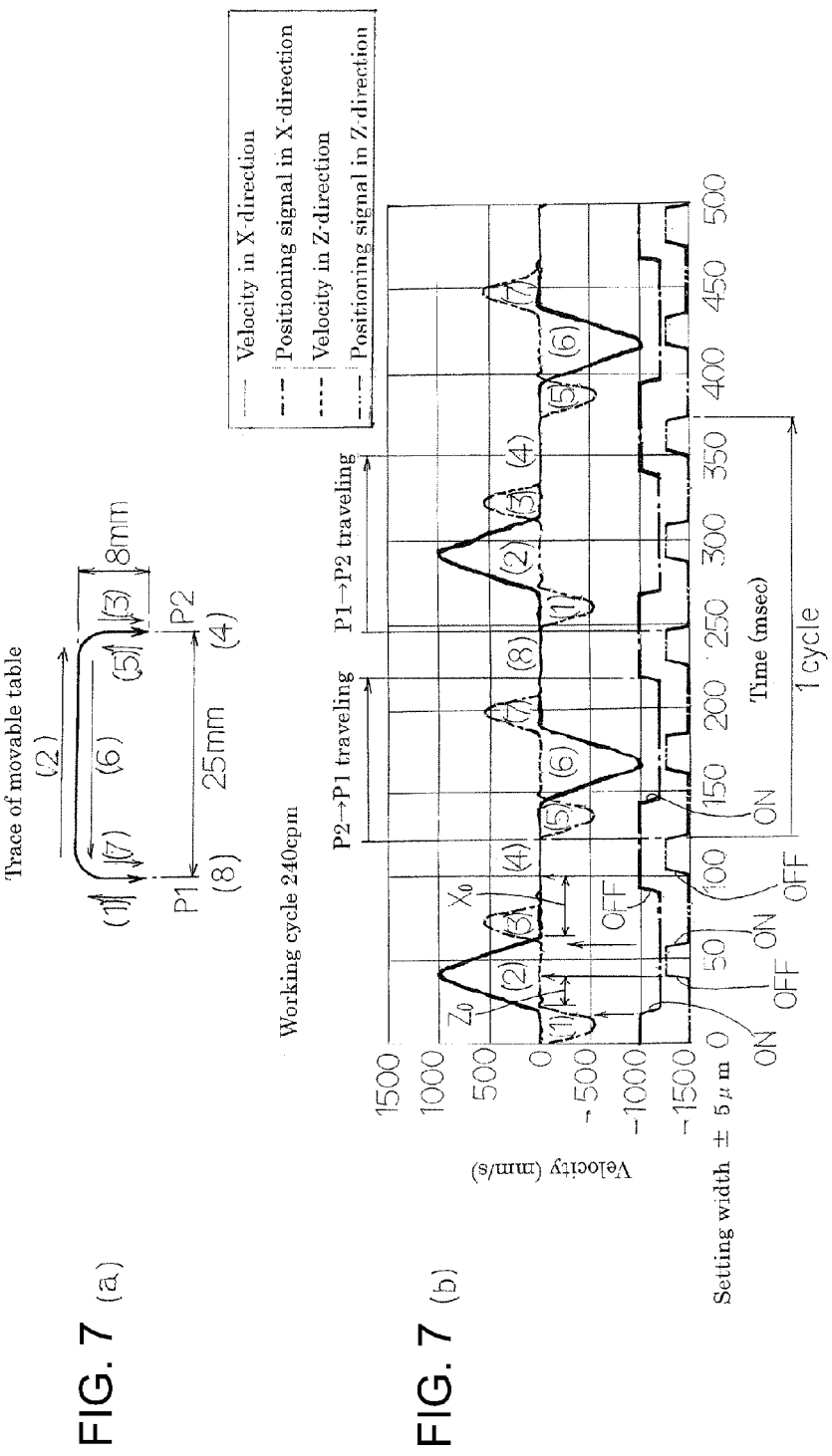
FIG. 7 is a view illustrating an operational mode of the sliding system of FIG. 1, in which (a) shows a locus tracing travel of the movable table, and (b) is a graphic representation of measured results in operation of the movable table.

In patterns (a) and (b) of FIG. 7, there is shown an example of operating states or phases of the movable table 32 in the three-dimensional X-Z sliding system according to the present invention. The operating state was carried out with no air cooling. A mass of parts loaded on the movable table 32 was 150 g and a stroke of the movable table 32 was 25 mm in the X-direction and 8 mm in the Z-direction. Meanwhile, a setting width was at ±5 μm. Working takt time or cycle time of the movable table 32 was 240 cpm when one cycle took 250 ms. The effective thrust was 15N in the X-direction and 15.6N in the Z-direction. Thus, it was proved that the sliding system was higher in both resolution and response quality. The setting width may refer to a set value tolerable with respect to the target or desired position. The setting width of ±5 μm as stated earlier is said to be the set value which is fit for high precision position-control. In the graphic representation (b) of FIG. 7, a dashed line refers to wave-form transition of a positioning signal in the X-direction and a two-dot chain shows a wave form of variation in a positioning signal in the Z-direction. As the X-linear motor 42 and the Z-linear motor 41 work with these positioning signals, respectively, the movable table 32 is actuated with velocity wave-forms in the X-direction as shown with a solid line and in the Z-direction as shown with a three-dotted line.

Referring to FIG. 7(a), there is shown how the movable table 32 works sequentially as stated later. At the same time as the Z-table 3 is energized to travel in the Z-direction, the movable table 32 linked with the Z-table 3 through the linear motion guide unit 4 moves in the Z-direction to a desired location where a chuck, not shown, mounted on the movable table 32 picks up a workpiece stored at a preselected position. As the X-table 2 then travels in the X-direction, the movable table 32 connected with the X-table 2 through the linear motion guide unit 5 simultaneously moves in the X-direction to a location into which the chuck is to be inserted. Thereafter, the energization of the Z-table 3 in the Z-direction causes the movable table 32 linked with the Z-table 3 through the linear motion guide unit 4 to move in the Z-direction to a targeted location where the chuck releases and places the workpiece on the appropriate position with high precision.

One example of the operating states or cycles of the three-dimensional X-Z sliding system of this invention will be described later in details. In FIG. 7(a), there is shown the operating state or cycle of three-dimensional X-Z sliding system spilt into phases (1) to (8). Wave forms (1) through (8) in FIG. 7(b) represent accelerations and decelerations in travels in X- and Z-directions, which are with reference to operating phases (1) to (8), respectively. The wave forms (4) and (8) means the velocities are at zero and it stops working to restart any of the wave forms (1) to (8). Rectangular-shaped pulse waves of the positioning signals shown with the dashed lines and the two-dot chains refer to "on-state" when lowering below the horizontal axis, whereas "off state" when rising above the horizontal axis. A sign Z0, for instance, teaches a time it takes the wave form of velocity in the Z-direction comes to rest at the targeted location, or "off-position" while slowing down to zero after acceleration and deceleration. The shorter the time Z0, the better will be the response quality for the setting width. Likewise, A sign X0 teaches a time it takes the wave form of velocity in the X-direction in the phase (2) comes to rest at "off state" of the positioning signal in the X-direction while slowing down to zero after acceleration and deceleration. The shorter the time X0, the better will be the response quality for the setting width. Thus, the response quality was proved to be improved better after observation of the times Z0 and X0 implicated with the operation of the movable table 32.

With the version as stated earlier, although but the first flat zone 38 extending in the X-direction of the bed 1, when viewed at the front of the bed 1, lies more leftward than the second flat zone 39 extending in the Z-direction and the third flat zone 40 where the first flat zone 38 merges with the second flat zone 39, it will be appreciated that the first flat zone 38 may be disposed rightward of the bed 1. As an alternative, movable tables may be placed on both of the front surface 46 and the rear surface 47 of the bed 1 opposite to each other. With the alternative version in which the movable tables is placed on the opposite surfaces of the bed 1, because the rear surface 47 of the bed 1 has to be prepared for the placement of the tables, the grooves 33 for the air cooling system are impracticable on the rear surface 47 of the bed 1 and, therefore, the air passages 36 of the air cooling system will be provided inside the bed 1.

What is claimed is:

1. A three-dimensional X-Z sliding system: comprising a stationary flat bed having a front surface and a rear surface lying in parallel with each other and lying in a Z-direction, an X-linear motor energized in an X-direction, a Z-linear motor energized in a Z-direction perpendicular to the X-direction, and a movable table allowed moving in the X-direction and the Z-direction by the energization of the X-linear motor and the Z-linear motor, respectively;

wherein the bed has an angled configuration composed of a first flat zone extending in the X-direction, a second flat zone extending in the Z-direction and a third flat zone where the first zone merges with the second flat zone, the bed being provided thereon with an X-table of rectangular configuration for traveling in the X-direction over the first flat zone and a Z-table of rectangular configuration for traveling in the Z-direction over the second and third flat zones;

wherein the X-table has a rectangular configuration having two opposite longer sides extending in the X-direction to an extent enough to lie over the first zone of the front surface on the bed, and the Z-table also has a rectangular configuration having two opposite longer sides extending in the Z-direction so as to cover substantially both the second zone and the third zone of the front surface on the flat bed, and wherein the X-table and the Z-table are installed on the bed to travel respectively without running into each other while ensuring the traveling range desired for each table; and wherein the movable table is a plate member small in size in comparison with the bed, the movable table lying to overlap with a front surface of the X-table and a front surface of the Z-table and having connections at a rear surface thereof with linear motion guide units one of which is installed on the X-table to force the movable table in the X-direction and another is installed on the Z-table to force the movable table in the Z-direction, whereby the movable table is controlled to move with respect to the bed in the X-direction and the Z-direction to a targeted position.

2. A three-dimensional X-Z sliding system constructed as recited in claim 1, which is used installed in a posture where the X-direction lies in a horizontal direction and the Z-direction coincides with a vertical direction.

3. A three-dimensional X-Z sliding system constructed as recited in claim 1, wherein the movable table is placed on the bed in such geometry as having a protruding part beyond the bed.

4. A three-dimensional X-Z sliding system constructed as recited in claim 3, wherein the movable table has an angled shape, which includes therein a horizontal area extending from the X-table to Z-table to lie over partially at one end the front surface of the X-table and at other end the front surface of the Z-table, and the protruding part lying over the front surface of the Z-table while extending down vertically in the Z-direction from the horizontal area so as to protrude beyond the Z-table.

5. A three-dimensional X-Z sliding system constructed as recited in claim 1, wherein the movable table is fastened on a rear surface thereof with a linear motion guide unit, which is placed on the front surface of the X-table for sliding movement in the Z-direction, and further connected on the rear surface thereof with another linear motion guide unit, which is arranged on the front surface of the Z-table for sliding movement in the X-direction.

6. A three-dimensional X-Z sliding system constructed as recited in claim 1, wherein the linear motion guide unit installed on the X-table is placed so as to extend on the front surface of the X-table along one shorter edge of the rectangular configuration of the X-table situated closed to the Z-table, and the linear motion guide unit installed on the front surface of the Z-table is placed so as to extend on the front surface of the Z-table along a lower one of two shorter opposite edges of the Z-table.

7. A three-dimensional X-Z sliding system constructed as recited in claim 2, wherein the linear motion guide units installed on the X-table and the Z-table, one to each table, are the same height starting at bottoms of the guide rails of the linear motion guide units and ranging up to tops of sliders of the linear motion guide units so that the front surfaces of the X-table and the front surface of the Z-table are coplanar or flush with one another, and the movable table after fastened on the rear surface thereof to the sliders, is placed of its own accord in the direction perpendicular to the bed in opposition to the surface of the bed.

8. A three-dimensional X-Z sliding system constructed as recited in claim 1, wherein the X-linear motor has a field magnet fastened to the rear surface of the X-table, and an armature assembly lying on one side of the bed in opposition to the field magnet, the field magnet being composed of a plurality of magnet strips juxtaposed closely in an array that their polarities alternate in a traveling direction of the X-table, and the armature assembly having a plurality of coreless armature windings of rectangular shape lying in juxtaposition on one side of the bed facing on the X-table, wherein the Z-linear motor has a field magnet fastened to the rear surface of the Z-table, and an armature assembly lying on one side of the bed in opposition to the field magnet, the field magnet being composed of a plurality of magnet strips juxtaposed closely in an array that their polarities alternate in a traveling direction of the Z-table, and the armature assembly having a plurality of coreless armature windings of rectangular shape lying in juxtaposition on one side of the bed facing on the Z-table, and wherein the armature assemblies of the X-linear motor and the Z-linear motor are identical in construction with one another and have the armature windings each of which is placed on one surface of a circuit board that is secured on other surface thereof to the one surface of the bed opposite to the X-table and the Z-table, and a protective sheet of thin film shields exposed surfaces of the armature windings opposite to the circuit board and further adhesive material of bonding agent molds the armature windings integral with the circuit board.

9. A three-dimensional X-Z sliding system constructed as recited in claim 1, wherein the bed, X-table and Z-table are of magnetic material including steel, the X-table and the Z-table functioning as magnet yokes for the X-linear motor and the Z-linear motor, and the bed serving as winding yokes for the X-linear motor and the Z-linear motor, and wherein the bed has a cooling system of passages each of which allows a cooling medium to flow to carry away heat arising from the X-linear motor and the Z-linear motor, the passage spreading or extending throughout the first flat zone and the second flat zone across the third flat zone.

10. A three-dimensional X-Z sliding system constructed as recited in claim 9, wherein the cooling passages are constituted with a plurality of grooves, which are provided on the rear surface of the bed in opposition to the X-linear motor and the Z-linear motor in such a fashion as to spread in parallel with each other throughout the first zone and the second zone across the third zone.

\* \* \* \* \*